UNITED STATES PATENT OFFICE.

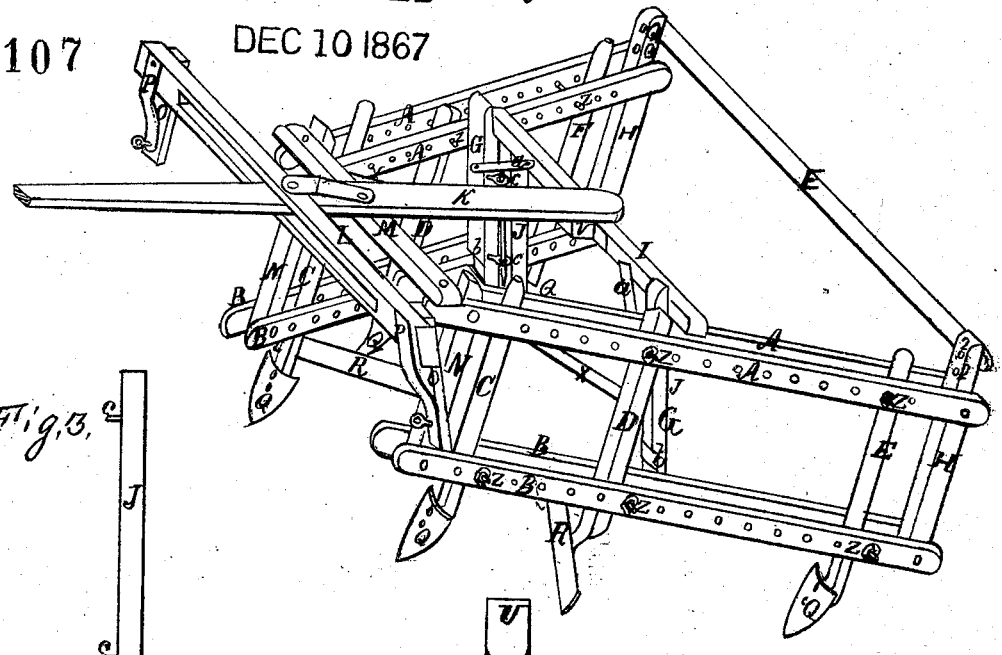
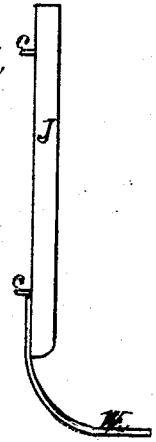
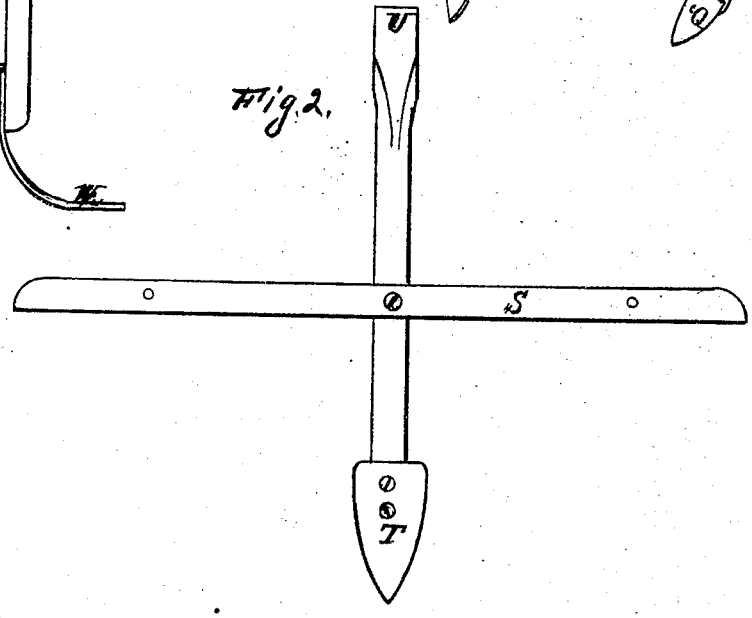

C. E. STELLER, OF CHICAGO, ILLINOIS.

IMPROVEMENT IN CULTIVATORS.

Specification forming part of Letters Patent No. 72,107, dated December 10, 1867.

*To all whom it may concern:*

Be it known that I, C. E. STELLER, of Chicago, in the county of Cook, in the State of Illinois, have invented an Improved Cultivator; and I do hereby declare that the following is a full and exact description thereof, reference being had to the accompanying drawings, and to the letters of reference marked thereon, making a part of this specification, in which—

Figure 1 is a perspective representation of my cultivator; Fig. 2, an elevation of the central shovel; Fig. 3, an elevation of one of the runners, which regulates the depth of the shovels and hoes in the ground.

The nature of my invention consists, first, in the use of slotted side frames, in which are fitted the shanks of the shovels and hoes in such a manner as will permit the latter to have any desired angle relative to a line in which the cultivator is being moved, and also such a pitch as may be necessary for cutting weeds and stirring the soil; second, in arranging the shanks of the shovels and hoes to be moved forward and back, as the case may require, in the slotted sides, for the purpose of regulating the distance of the two rows of shovels and hoes from each other, the front ends of the slotted sides being set nearer together than the rear ends in order to accomplish this purpose; third, in constructing a double evener, through which the tongue is made to pass and prevent said evener from having a swinging motion in a vertical plane, and also in the use of inclined hanging braces for bringing the draft-line down to a suitable point for operating the cultivator without making the evener too long; fourth, in arranging a guide by means of two or more holes in the rear standards, so that said guide can be set at such a height as will suit various-sized persons who may operate the cultivator; fifth, in the construction and use of hinged runners for regulating the depth of the shovels and hoes in the ground; sixth, in securing vertical standards to the slotted frames for the double purpose of supporting the hinged runners and a central shovel, the shank of the latter being hung to said standards; seventh, the general arrangement of the cultivator, as will hereinafter be shown.

In order to give a correct understanding of my invention, I have marked corresponding parts with similar letters, and will now give a detailed description, which will enable others skilled in the art to make and use my invention.

A A represent the upper and B B the lower slotted sides, arranged to support the shanks C E of shovels Q Q and the shanks D D of hoes R R, said shanks being arranged so as to move forward or back, or be set at any angle desired for cutting weeds or tilling the soil. This arrangement is very simple, yet important in regulating the position of the plows and shovels; and as they can be loosened and fastened by means of set-screws Z Z and bolts put through holes *i*, &c., in sides A B, no difficulty need be experienced in setting the shovels and plows to cultivate any kind of crop put out in rows, or tilling common soil. The upper part of the frame-work or sides is secured by cross-pieces M I and a guide-bar, E, the latter being used to regulate the cultivator, and can be set high or low by means of bolts put through the holes 2 2, Fig. 1.

Standards G G are made fast to the sides A B, and used both to strengthen the sides and provide means for the support of the runners J W. These runners J W are made part of wood and part of metal, the latter being curved to run upon the ground, and the wood part J hinged to the standards G G in order that the runners may turn easily with the motion of the cultivator and conform to crooked and straight rows, as the case may require.

The double evener L is made with a long slot, through which the tongue K is made to pass and prevent said evener from tipping over to the front or back when in use; and to secure said evener in place I put a brace, Y, over its top and a similar brace at the bottom and secure said braces by a bolt put through said evener and the front cross-bar, M. The evener L has also braces O O, inclined outward and extending down far enough to give a suitable draft-point for the attachment of whiffletrees; and to secure said braces in place braces P P are attached rigidly to the ends of the evener L and the lower end of the braces, thus securing strength and durability.

The central shovel, T, is represented as removed in Fig. 1, but is intended to be secured to the cultivator by means of the bar S bolted to the standards G G, and the end of shank U fitted in a socket, V, attached to cross-bar I, notches *b b*, Fig. 1, being cut in said standards for the purpose of holding bar S in position without too great a strain on the bolts, which hold the bar fast.

The operation of the cultivator is so simple as to require no further explanation.

Having thus described my device, what I claim, and desire to secure by Letters Patent, is—

1. The hinged runners J W, substantially as and for the purpose set forth.

2. The slotted sides A A and B B, in combination with the shanks C D E, arranged to be set at different angles and fastened by set-screws Z Z, as described.

3. The combination of the guide-bar E, arranged to be raised and lowered, with rear standards, H H, and sides A A B B, as described.

4. The combination of standards G G, hinged runners J W, and sides A A B B, as set forth.

5. The shanks U of shovel T, arranged to fit in a socket, V, and bar S, in combination with standards G G and cross-bar I, as and for the purpose set forth.

6. The double evener L, arranged substantially as set forth.

7. The double evener L, in combination with braces O O and P P, with or without braces Y, substantially as set forth.

C. E. STELLER.

Witnesses:
G. L. CHAPIN,
A. HAYWARD.